UNITED STATES PATENT OFFICE.

PERCY HEAD BAILY, OF LONDON, COUNTY OF MIDDLESEX, ENGLAND, ASSIGNOR OF ONE-HALF TO B. F. SMITH, OF CHICAGO, ILLINOIS.

BISCUIT.

SPECIFICATION forming part of Letters Patent No. 396,456, dated January 22, 1889.

Application filed March 31, 1888. Serial No. 269,130. (No specimens.)

*To all whom it may concern:*

Be it known that I, PERCY HEAD BAILY, a subject of the Queen of Great Britain, residing at London, in the county of Middlesex, Kingdom of Great Britain, have invented certain new and useful Improvements in Health Biscuits; and I do declare the following to be a full, clear, and exact description of the invention, such as will enable others skilled in the art to which it appertains to make and use the same.

My invention relates to the production of a food preferably in the form of a biscuit or cake, which is not only highly nutritious, but possesses medicinal and curative qualities, and which I have denominated "health biscuit."

This food or biscuit is produced by combining a base consisting of the following ingredients, to wit: Flour or some other highly-nutritious meal, butter, sugar, and milk, with a proper amount of a powder produced from the following chemical components, to wit: tribasic phosphate of calcium, carbonate of calcium, fluoride of calcium, phosphate of magnesium, phosphate of soda, chloride of sodium.

These chemical ingredients are mixed together to form a powder in about the following proportions, (apothecary's weight:) tribasic phosphate of calcium, six pounds three drams two grains; carbonate of calcium, one pound three drams one scruple; fluoride of calcium, two drams; phosphate of magnesium, one dram ten grains; phosphate of soda, one dram; chloride of sodium, twelve grains.

Of this powder, I take nine (9) ounces, by apothecary's weight, to mix with the following amounts of the ingredients of the base, (by avoirdupois weight:) flour, twelve pounds; butter, one pound; sugar, four pounds; milk, three quarts. The mass is then thoroughly kneaded, worked into biscuits or cakes, and baked in the ordinary way.

The chemical ingredients herein named are such as are found on the market in the form of separate drugs or chemicals, and are consequently obtainable in a pure state and free from organic or animal matter.

I am aware that ground bone, which contains chemical ingredients like those employed by me, has been used with flour, &c., for the production of bread, and I do not claim nor desire to cover by this patent ground bone, as such not only contains the desired chemical elements but also certain fats and organic matter which render its use objectionable; and, furthermore, the use of ground bone, which is a natural product or growth containing specific amounts of each of its constituent parts, necessitates unvarying proportions of the different ingredients, whereas by taking the chemicals separately and mixing them into an artificial powder any required proportion is obtainable, which is very desirable in case of making edible breadstuffs for different constitutions and climates. I desire to entirely avoid the use of the gelatine, which enters largely into the composition of bone and must be present in all ground bone. It will be understood, therefore, that I do not desire to confine myself to the proportions herein given, as they may be varied as to one or more of the chemical or base ingredients without departing from the spirit nor sacrificing the advantage of my invention.

Any of the nutritious meals may be used instead of wheat flour—as, for instance, lentil, pea, bean, or corn flour or meal; but I prefer the ordinary wheat-flour.

Having thus described my invention, what I claim, and desire to secure by Letters Patent, is—

A food or health biscuit composed of a flour, butter, sugar, and milk combined with an artificial powder consisting of tribasic phosphate of calcium, carbonate of calcium, fluoride of calcium, phosphate of magnesium, phosphate of soda, and chloride of sodium, substantially in the proportions set forth.

In testimony whereof I affix my signature in presence of two witnesses.

PERCY HEAD BAILY.

Witnesses:
BERTIE BERG,
G. A. WOODTHORPE.